United States Patent
Pareek et al.

(10) Patent No.: US 10,409,807 B1
(45) Date of Patent: Sep. 10, 2019

(54) APPARATUS AND METHOD FOR DATA REPLICATION MONITORING WITH STREAMED DATA UPDATES

(71) Applicant: Striim, Inc., Palo Alto, CA (US)

(72) Inventors: Alok Pareek, Hillsborough, CA (US); Steve Wilkes, Santa Clara, CA (US); Swapna Ratnani, San Jose, CA (US); Dmitry Rudakov, San Carlos, CA (US)

(73) Assignee: Striim, Inc., Palo Alto, CA (US)

( * ) Notice: Subject to any disclaimer, the term of this patent is extended or adjusted under 35 U.S.C. 154(b) by 213 days.

(21) Appl. No.: 15/272,209

(22) Filed: Sep. 21, 2016

Related U.S. Application Data

(60) Provisional application No. 62/222,712, filed on Sep. 23, 2015.

(51) Int. Cl.
G06F 16/23 (2019.01)
G06F 16/27 (2019.01)

(52) U.S. Cl.
CPC ...... *G06F 16/2379* (2019.01); *G06F 16/2365* (2019.01); *G06F 16/27* (2019.01)

(58) Field of Classification Search
CPC ......... G06F 17/30377; G06F 17/30371; G06F 17/30575; G06F 11/004; G06F 11/006; G06F 11/2289; G06F 16/2379; G06F 16/2365; G06F 16/27
USPC ...................................................... 707/615
See application file for complete search history.

(56) References Cited

U.S. PATENT DOCUMENTS

| | | | | |
|---|---|---|---|---|
| 6,032,518 | A * | 3/2000 | Prater | B82Y 35/00 73/105 |
| 7,680,831 | B1 * | 3/2010 | Gandhi | H04L 41/0654 707/999.2 |
| 9,756,119 | B2 | 9/2017 | Pareek et al. | |
| 10,200,459 | B2 | 2/2019 | Pareek et al. | |
| 2002/0133507 | A1 * | 9/2002 | Holenstein | G06F 11/2064 |
| 2009/0157767 | A1 * | 6/2009 | Doty | G06F 11/0751 |
| 2011/0196833 | A1 * | 8/2011 | Drobychev | G06F 17/30575 707/634 |

(Continued)

OTHER PUBLICATIONS

Martin Kleppmann. "Bottled Water: Real-time integration of PostgreSQL and Kafka". Apr. 23, 2015; accessed Jun. 15, 2018 from <https://www.confluent.io/blog/bottled-water-real-time-integration-of-postgresql-and-kafka/> (Year: 2015).*

(Continued)

*Primary Examiner* — Robert W Beausoliel, Jr.
*Assistant Examiner* — Arthur Ganger
(74) *Attorney, Agent, or Firm* — Cooley LLP

(57) ABSTRACT

A method implemented in a computer network includes identifying a transactional change data capture event at a transactional database. A transaction event stream is created with metadata characterizing the transactional change data capture event. A replication change data capture event is identified at a replication database corresponding to the transactional database. A replication event stream with metadata characterizing the replication change data capture event is created. The transaction event stream and the replication event stream are evaluated to selectively identify a replication performance failure within a specified time threshold of the replication performance failure.

3 Claims, 5 Drawing Sheets

(56) References Cited

U.S. PATENT DOCUMENTS

| | | | |
|---|---|---|---|
| 2012/0054533 A1* | 3/2012 | Shi .................... | G06F 11/2094 |
| | | | 714/4.1 |
| 2015/0378840 A1* | 12/2015 | Shang ................ | G06F 11/1474 |
| | | | 714/20 |
| 2017/0032010 A1* | 2/2017 | Merriman ......... | G06F 17/30289 |
| 2017/0147630 A1* | 5/2017 | Scott ................ | G06F 17/30371 |
| 2017/0270153 A1* | 9/2017 | Bantupalli ........ | G06F 17/30371 |
| 2017/0270175 A1* | 9/2017 | Bantupalli ........ | G06F 17/30578 |
| 2018/0067826 A1* | 3/2018 | Earl ................. | G06F 17/30191 |

OTHER PUBLICATIONS

M. A. Meinagh, et al. "Database Replication with Availability and Consistency Guarantees through Failure-Handling," 2007 International Multi-Conference on Computing in the Global Information Technology (ICCGI'07), Guadeloupe City, 2007, doi: 10.1109/ICCGI.2007.20 (Year: 2007).*

* cited by examiner

APPARATUS AND METHOD FOR DATA REPLICATION MONITORING WITH STREAMED DATA UPDATES

CROSS REFERENCE TO RELATED APPLICATIONS

This application claims priority to U.S. Provisional Patent Application No. 62/222,712 filed Sep. 23, 2015, the contents of which are incorporated herein by reference.

FIELD OF THE INVENTION

This application relates generally to data replication for disaster recovery. More particularly, this application relates to techniques for data replication monitoring with streamed data updates.

BACKGROUND OF THE INVENTION

FIG. 1 illustrates a first database at a first physical site 100. The database includes original transactions for the first database 102 at site 100. The database also includes replicated transactions for a second database 104. The replicated transactions are for the purpose of disaster recovery.

FIG. 1 also illustrates a second database at a second physical site 106. This database includes original transactions for the second database 108 at site 106. The database also includes replicated transactions for the first database 110 at site 100.

A replication coordinator 112 operates between the first database 100 and the second database 106. The replication coordinator 112 collects Change Data Capture (CDC) events for the original transactions for the first database 102 and generates write commands to form the replicated transactions 110. Similarly, the replication coordinator 112 collects CDC events for the original transactions for the second database 108 and generates write commands to form the replicated transactions 104.

Prior art systems of the type shown in FIG. 1 operate on the assumptions that what is supposed to happen will happen. There are no mechanisms to track data "in flight". That is, the system of FIG. 1 is typically implemented across a network with the first database 100, the second database 106 and the replication coordinator 112 potentially being on machines across the globe. As data moves over networks traversing great distances, any number of mishaps may occur that result in the loss of data. Data loss is most often addressed via manual audits of the database or via packaged solutions executed in batch mode. Both of these approaches introduce significant cost and large latencies. In particular, manual audits are very expensive. Batch mode operations, usually performed after hours or on weekends, can only spot problems hours or days after they occur. Therefore, they cannot spot intermediate inconsistencies. This causes problems that can compound as subsequent transactions update inconsistent states of database tables. Depending upon the nature of the data, data loss can have catastrophic consequences. In many industries it is essential that data inconsistencies be identified immediately to avoid severe operational and financial impacts.

In view of the foregoing, there is a need for a non-intrusive real-time verification mechanism that continuously and incrementally monitors replication solutions to ensure full replication of data between databases.

SUMMARY OF THE INVENTION

A method implemented in a computer network includes identifying a transactional change data capture event at a transactional database. A transaction event stream is created with metadata characterizing the transactional change data capture event. A replication change data capture event is identified at a replication database corresponding to the transactional database. A replication event stream with metadata characterizing the replication change data capture event is created. The transaction event stream and the replication event stream are evaluated to selectively identify a replication performance failure within a specified time threshold of the replication performance failure.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

The disclosed technology uses a secondary change data capture (CDC) mechanism to capture transactions being committed on a source database that can be seen by the data replication solution and moved to the target. It also captures transactions that the data replication solution is applying to the target.

It then checks that every transaction committed on the source is also committed on the target, matching and providing the lag between the two. If any transaction is not committed on the target within a configurable time period or specified time threshold, that transaction is logged and an administrator is alerted. This solution works for single and bidirectional active/active replication.

Advantageously, the disclosed solution provides immediate notification if a transaction is missed. This allows database administrators to fully synchronize the database before operations continue and major problems occur. The solution also delivers root-cause information by indicating exactly which transactions are missing and which tables are affected. The solution enables an enterprise to be able to fully rely on their secondary systems when a primary system fails.

Figure 1:
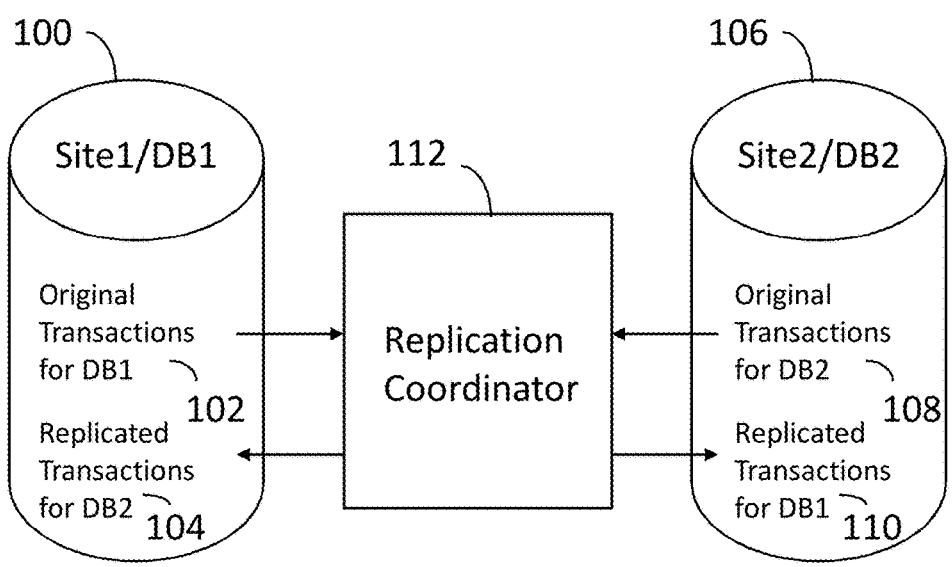
FIG. 1 illustrates a prior art data replication system.
Figure 2:
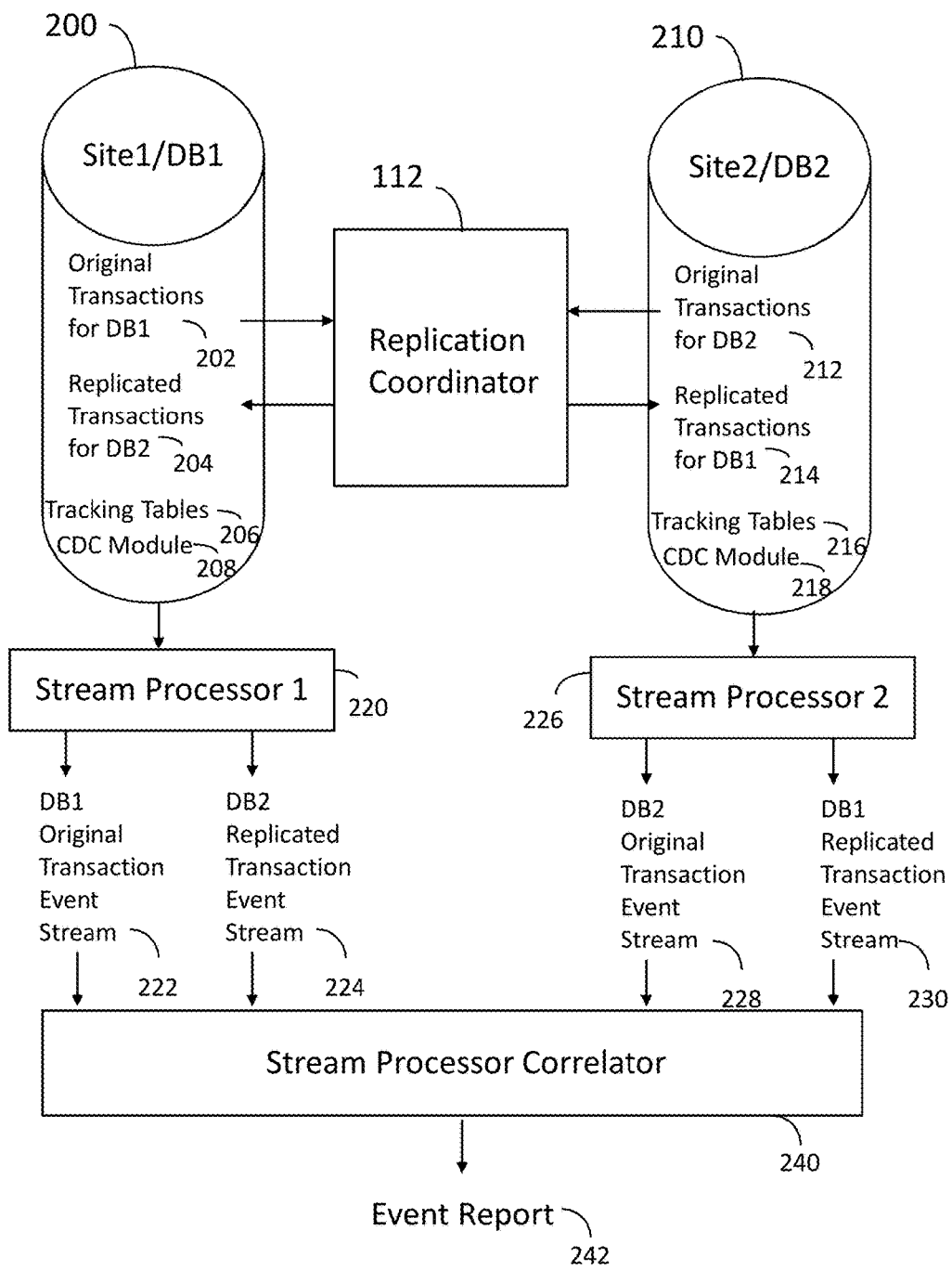
FIG. 2 illustrates a data replication system configured in accordance with an embodiment of the invention.

FIG. 2 illustrates a system configured in accordance with an embodiment of the invention. The system includes components discussed in connection with FIG. 1, such as a first database at a first site 200, original transactions for the first database 202, replicated transactions for the second database 204, a replication coordinate 112, a second database at a second site 210 with original transactions for the second database 212 and replicated transactions for the first database 214. However, the system includes additional components to support operations of the invention. In particular, the first database 200 is augmented to include tracking tables 206 and a CDC module 208. The tracking tables 206 store metadata regarding a database transaction. The metadata may include such things as a database table name, a transaction id, a transaction time, a user id, an event type and the like. The CDC module 208 may be configured to populate the tracking tables 206. Alternately, a stream processor may evaluate CDC events and populate the tracking tables. For example, any CDC event may result in the stream processor generating tracking table metadata including a database table name, a transaction id, a transaction time, a user id and an event type.

The CDC module 208 collects database transactions and passes them to a first stream processor 220. More particularly, the stream processor 220 generates or accesses metadata regarding a database transaction. The metadata may be of the type discussed above in connection with the tracking tables. The stream processor 220 emits a first database original transaction event stream 222 and a second database replicated transaction event stream 224.

FIG. 2 also illustrates tracking tables 216 and a CDC module 218 in the second database 210. The second stream processor 226 generates or accesses metadata regarding a database transaction. The second stream processor 226 emits a second database original transaction event stream 228 and a first database replicated transaction event stream 230.

The same or another stream processor 240 applies rules to corresponding event streams. That is, the stream processor 240 applies rules to first database original transaction event stream 222 and first database replicated transaction event stream 230 to selectively identify a replication performance failure as an event report 242. As demonstrated below, a replication performance failure is reported within a specified time threshold.

Similarly, the second database original transaction event stream 228 is evaluated in connection with the second database replicated transaction event stream 224 to selectively identify a replication performance failure.

Observe that the stream processor 240 is operative on metadata "in flight". The stream processor 240 is an in-memory processor that applies rules and reports events. It is effectively a continuous query engine. A code example is provided below.

The configuration of FIG. 2 is exemplary. A single database may have replicated transactions for any number of databases. Therefore, the stream processor may produce any number of replicated transaction event streams.

Figure 3:
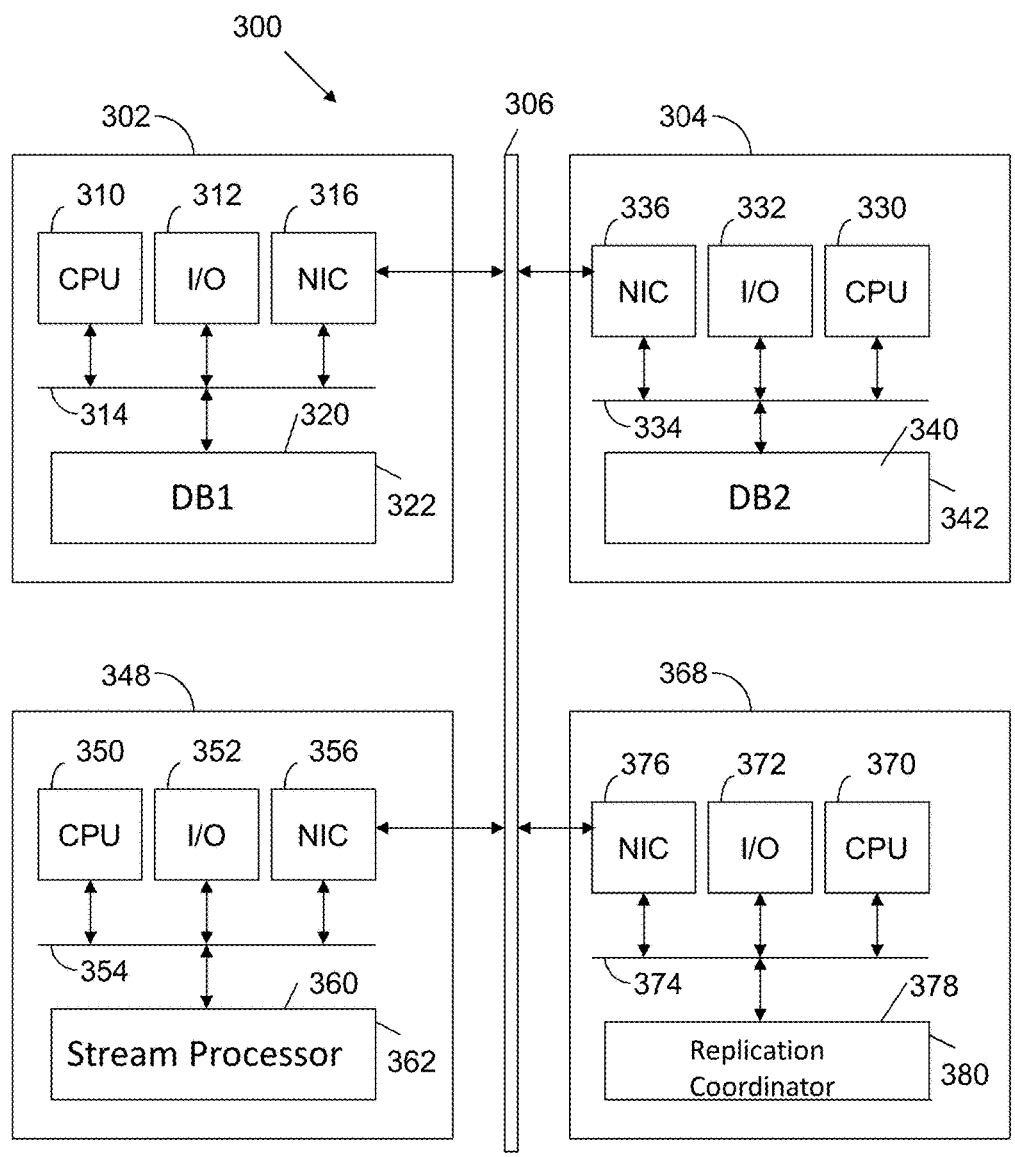
FIG. 3 illustrates a system configured in accordance with an embodiment of the invention.

FIG. 3 illustrates a system 300 configured in accordance with an embodiment of the invention. The system 300 includes exemplary machines to implement an embodiment of the invention. A first machine 302 is connected to a second machine 304 via a network 306, which may be any combination of wired and wireless networks. The first machine 302 includes standard components, such as a central processing unit 310 connected to input/output devices 312 via a bus 314. A network interface circuit 316 is also connected to the bus 314 to provide connectivity to network 306. A memory 320 is also connected to the bus 314. The memory 320 stores a first database 322. The first database 322 may include the elements shown in the first database 200 of FIG. 2.

The second machine 304 also includes standard components, such as a central processing unit, input/output devices 332, a bus 334 and a network interface circuit 336. A memory 340 is connected to bus 334. The memory 340 stores a second database 342. The second database 342 may include the elements shown in the second database 210 of FIG. 2.

A third machine 348 also includes standard components, such as a central processing unit 350, input/output devices 352, a bus 354 and a network interface circuit 356. A memory 360 is also connected to the bus 354. The memory 360 stores a stream processor 362. Stream processor 362 refers to one or more of stream processors 220, 226 and 240 of FIG. 2. The stream processor 362 includes instructions executed by the central processing unit 350 to implement operations of the invention.

A fourth machine 368 also includes standard components, such as a central processing unit 370, input/output devices 372, a bus 374 and a network interface circuit 376. A memory 378 is connected to the bus 374. The memory 378 stores a replication coordinator 380. The replication coordinator 380 operates as discussed in connection with FIG. 1. The current invention augments the functionality of the replication coordinator 380.

The configuration of FIG. 3 is exemplary. A single database may be distributed across many networked machines. The stream processor 362 may be incorporated on a machine hosting a database or may be combined with the replication coordinator. It is the operations of the invention that are significant, not the particular manner in which those operations are implemented.

Figure 4:
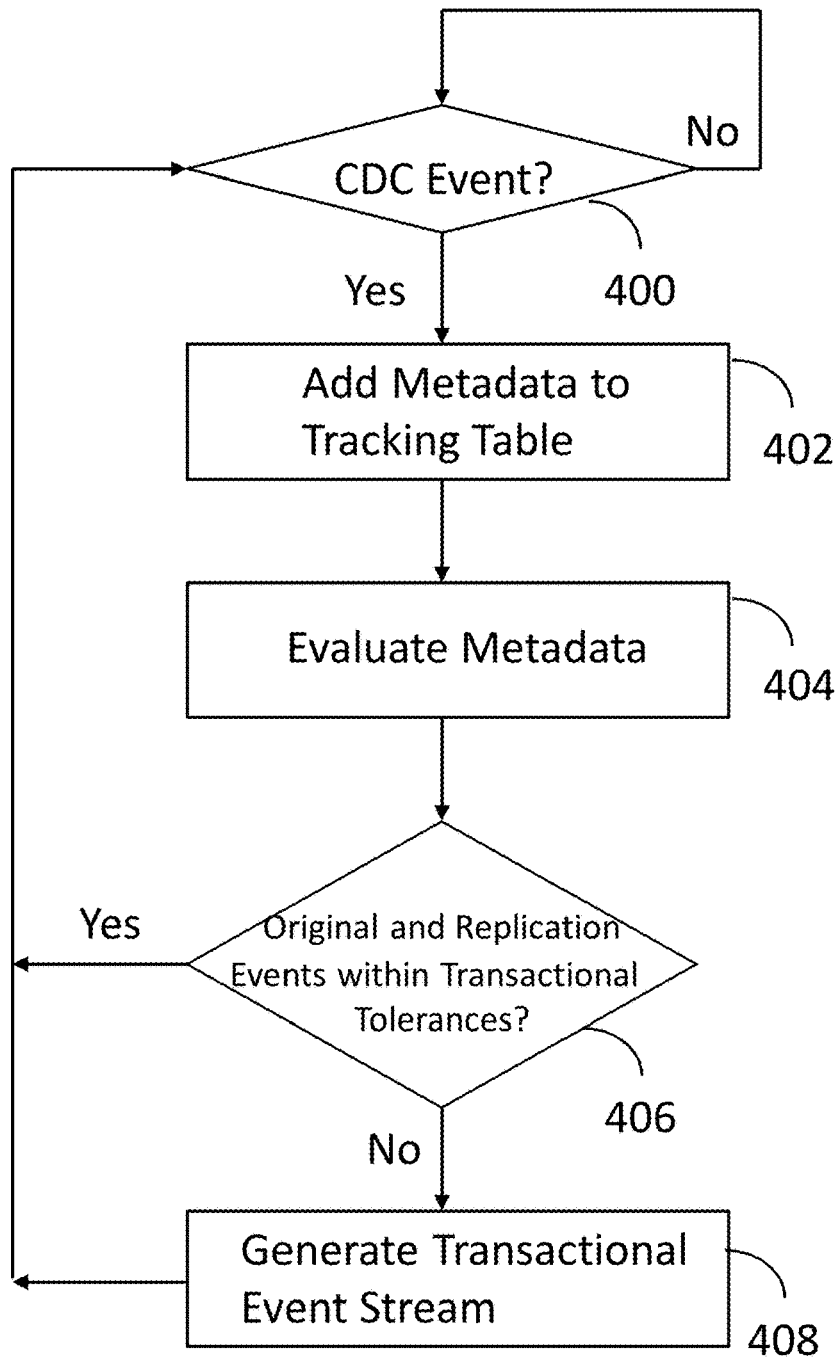
FIG. 4 illustrates processing operations associated with an embodiment of the invention.

FIG. 4 illustrates processing operations associated with an embodiment of the stream processor 362. The stream processor 362 monitors CDC events. If a CDC event occurs (400—Yes), then metadata is added to a tracking table 402. The event may be an original transaction event or a replicated transaction event. The metadata may include such items as a database table name, a transaction id, a transaction time, a user id and an event type.

The metadata is evaluated 404. Based upon the evaluation, a decision is made to determine whether the original and replication events are within transactional tolerances 406. If so (406—Yes), then control returns to block 400. If not (406—No), a transactional event stream is generated 408 and then control returns to block 400.

Figure 5:
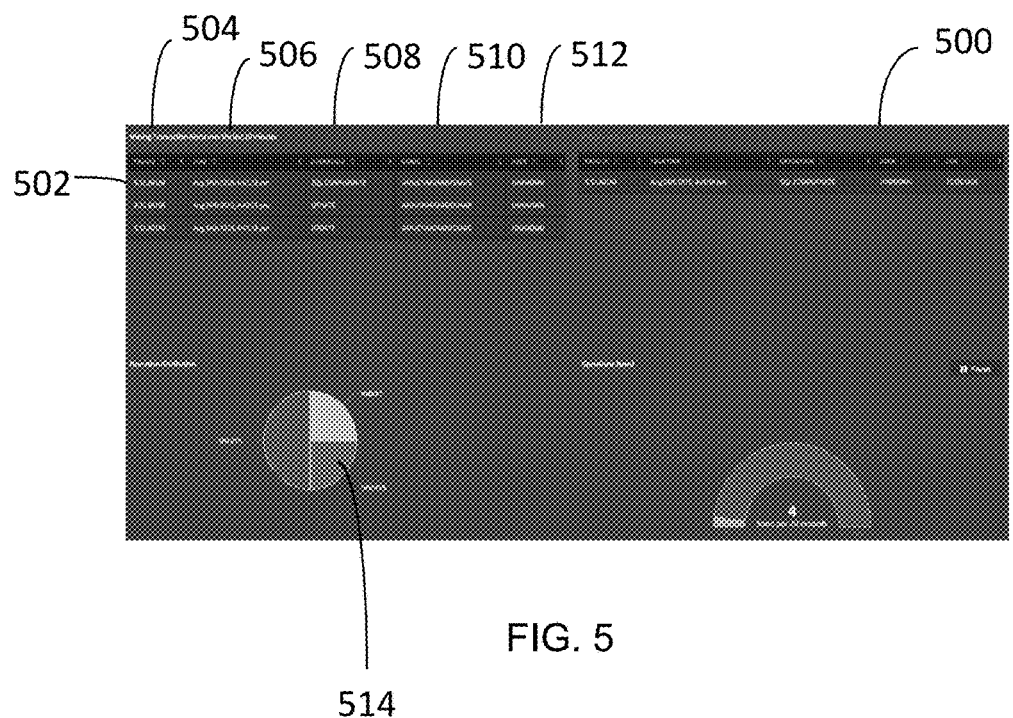
FIG. 5 illustrates transactional event streams supplied in accordance with an embodiment of the invention.

FIG. 5 illustrates an interface 500 showing transactional events. Each transactional event is a row 502 with columns of associated metadata, in this case a transaction id column 504, an event time stamp column 506, an event operation column 508, a row id column 510 and a user id column 512. The interface 500 may also include one or more visualizations 514.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA@, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The following code provides an example of an implementation of the disclosed invention. The code includes explanatory documentation.

-- STOP APPLICATION TableSynchApp;

-- UNDEPLOY APPLICATION TableSynchApp;

-- DROP APPLICATION TableSynchApp CASCADE;

use global;

drop namespace TableSynchApp cascade;

create namespace TableSynchApp;

use TableSynchApp;

CREATE APPLICATION TableSynchApp;

CREATE FLOW TableSynchSource;

--Specify first database source;

Create Source Rac11g1 Using OracleReader (

Username:'miner',

Password:'miner',

ConnectionURL:'10.1.110.128:1521:orcl',

Tables:'SCOTT.SIMPLESOURCE2',

OnlineCatalog:true,

FetchSize:'1',

QueueSize:'2148',

CommittedTransactions:true,

Compression:false,

FilterTransactionState:false

)

--Send output to first logical change record stream;

Output To LCRStream1;

--Specify second database source;

Create Source Rac11g2 Using OracleReader (

Username:'miner',

Password:'miner',

ConnectionURL:'10.1.110.128:1521:orcl',

Tables:'SCOTT.GGMETADATA2;',

OnlineCatalog:true,

FetchSize:1,

QueueSize:2148,

CommittedTransactions:true,

Compression:false,

FilterTransactionState:false

)

--Send output to second logical change record stream;

Output To LCRStream2,

LCRStreamGG MAP (table:'SCOTT.GGMETADATA2');

-- Create Target retrace1 Using Sysout (name:'Trace1') input From LCRStream1;

-- Create Target ggtrace2 Using Sysout (name:'Trace2') input From LCRStream2;

-- Create Target ggtrace3 Using Sysout (name:'TraceLCRStreamGG') input From LCRStreamGG;

CREATE TYPE tableRow( tranId String KEY, tranCsn String, trTime DateTime, opName String, rowId String

);

CREATE TYPE tableCompRow( tranId String KEY, tranCsn String, trTime DateTime, opName String, rowId String, ggtranId String,

```
    ggtranCsn String, ggtrTime DateTime, ggopName String, ggrowId String

);
```

CREATE STREAM newTableStream OF tableRow partition by tranId;

CREATE STREAM newTableStream2 OF tableRow partition by tranId;

--Add metadata to tracking table;

CREATE CQ renderTab1Events

INSERT INTO newTableStream

SELECT

META(x,"TxnID").toString(),

META(x,"SCN").toString(),

TO_DATE(META(x,"TimeStamp")),

META(x,"OperationName").toString(),

META(x,"ROWID").toString()

FROM LCRStream1 x;

CREATE CQ renderTab2Events

INSERT INTO newTableStream2

SELECT x.TRANSACTIONID, x.CSN, TO_DATE(x.TIMESTAMP , "yyyy-MM-dd HH:mm:ss"), x.OPTYPE, x.RROWID FROM LCRStreamGG x;

Create Target trace2 Using Sysout (name:'TableCdc') input From newTableStream;

Create Target trace3 Using Sysout (name:'GGMetaCdc') input From newTableStream2;

END FLOW TableSynchSource;

/************************************ main app flow

************************************/

CREATE FLOW TableSynchLogic;

-- Establish transaction tolerances. In this example, CREATE JUMPING WINDOW KEEP RANGE 5 MINUTE ON TimestampField WITHIN 6 MINUTE -- CREATE JUMPING WINDOW replicatedRowsWindow OVER newTableStream KEEP WITHIN 15 second ON trTime;

-- CREATE JUMPING WINDOW ggtrackingTableWindow OVER newTableStream2 KEEP WITHIN 15 second ON trTime;

-- CREATE JUMPING WINDOW replicatedRowsWindow KEEP RANGE 20 second ON trTime WITHIN 20 second;

```
-- CREATE JUMPING WINDOW ggtrackingTableWindow KEEP RANGE 20 second ON trTime WITHIN 20 second;

-- create sorter to synchronize streams
-- sort by rowid as it seems to grow monotonically -- CREATE SORTER MySorter OVER
--      newTableStream  ON rowId OUTPUT TO newTableStreamSorted,
--      newTableStream2 ON rowId OUTPUT TO newTableStream2Sorted
--      WITHIN 30 second
--   OUTPUT ERRORS TO sortOutOfOrderEventErrorStream;

-- create jumping widow with time range

CREATE WINDOW replicatedRowsWindow OVER newTableStream
    KEEP RANGE 60 SECOND ON trTime WITHIN 30 SECOND;

/*  CREATE WINDOW ggtrackingTableWindow OVER newTableStream2Sorted
    KEEP RANGE 30 SECOND ON trTime WITHIN 30 SECOND;   */

CREATE TYPE tableMergeRow(
   tranId String KEY,
   tranCsn String,
   trTime DateTime,
   opName String,
```

```
    rowId String, rowType int

);
```

CREATE STREAM mergeStream OF tableMergeRow;

-- merge source and metadata steams into one

-- insert into MergedStream select id, 1 from Source1

-- insert into MergedStream select id, 2 from Source2

CREATE CQ rendermergeStream1

INSERT INTO mergeStream

SELECT tranId, tranCsn, trTime, opName, rowId, 1 FROM newTableStream;

CREATE CQ rendermergeStream2

INSERT INTO mergeStream

SELECT tranId, tranCsn, trTime, opName, rowId, 2 FROM newTableStream2;

Create Target traceMergeStream Using Sysout (name:'mergeStream') input From mergeStream;

/************************************************************** create sorter over MergedStream output to OrderedMergedStream since event are out of order as source events are always first and GG metadata tracking arrive with a delay.

NOTE: May need to sort on transaction time instead of rowid

```
***************************************************************/

-- CREATE SORTER MySorter OVER

--     mergeStream ON trTime OUTPUT TO mergedStreamSorted

--     WITHIN 60 second

--   OUTPUT ERRORS TO sortOutOfOrderEventErrorStream;

--

--   Create Target traceMergedStrSorted Using Sysout (name:'mergedStreamSorted') input From mergedStreamSorted;

--

--   CREATE WINDOW mergedWindow OVER mergedStreamSorted KEEP RANGE 60 SECOND ON trTime WITHIN 60 SECOND;

--   CREATE JUMPING WINDOW  mergedWindow OVER mergeStream KEEP WITHIN 60 second ON trTime;

/***************************************************************
    test table differences with left join (check for nulls in table2); below is a query that tests transactional tolerances
***************************************************************/

/*    CREATE WACTIONSTORE LJStore CONTEXT OF tableCompRow
        EVENT TYPES ( tableCompRow KEY( tranId) )
        PERSIST NONE USING ( ) ;
``` with dumpinput,dumpoutput

CREATE CQ renderLJStore

INSERT INTO LJStore

SELECT w1.tranId, w1.tranCsn, w1.trTime , w1.opName , w1.rowId, w2.tranId, w2.tranCsn, w2.trTime , w2.opName , w2.rowId FROM replicatedRowsWindow w1

LEFT OUTER JOIN ggtrackingTableWindow w2

ON w2.tranId = w1.tranId and w2.rowId = w1.rowId where w2.tranId IS NULL; */

/**************************************************** find table differences by finding all groups with 1 row i.e. there is no matching row

****************************************************/

-- CREATE WINDOW mergedWindow OVER mergeStream KEEP RANGE 60 SECOND ON trTime WITHIN 60 SECOND;

CREATE WINDOW mergedWindow OVER mergeStream KEEP 2 rows

WITHIN 20 SECOND

PARTITION BY tranId, rowId;

CREATE TYPE alertRow(

```
tranId String KEY, trTime DateTime, rowId String, count int

);

CREATE WACTIONSTORE MatchAlertStore CONTEXT OF alertRow

EVENT  TYPES ( alertRow KEY( tranId) )

PERSIST NONE USING ( ) ;

CREATE STREAM matchRowStream OF alertRow;

--with dumpinput,dumpoutput

-- rstream will make it publish data when something is removed vs. added

CREATE CQ renderMatchAlertStore1

INSERT INTO matchRowStream

SELECT rstream tranId, trTime, rowId, count(*)

FROM mergedWindow group by tranId, rowId;

with dumpinput,dumpoutput

CREATE CQ renderMatchAlertStore2

INSERT INTO MatchAlertStore

SELECT *

FROM matchRowStream where count = 0;
```

-- dump all transactions from source and GG for debugging \*\*\*\*\*\*\*\*\*\*\*\*\*\*\*

CREATE WACTIONSTORE AllMergedRowsStore CONTEXT OF tableMergeRow

EVENT TYPES ( tableMergeRow KEY( tranId) )

PERSIST NONE USING ( ) ;

CREATE CQ renderAllMergedRowsStore

INSERT INTO AllMergedRowsStore

SELECT w.tranId, w.tranCsn, w.trTime, w.opName, w.rowId, w.rowType

FROM mergedWindow w;

/\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\* see what arrived in (1h) into match window and alert if there is only 1 row identified by transaction and row id – selective alerting mechanism \*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*/

CREATE jumping WINDOW MatchWindow OVER mergeStream KEEP WITHIN 30 second;

CREATE STREAM alertStream OF tableMergeRow;

CREATE WACTIONSTORE AlertStore CONTEXT OF tableMergeRow

EVENT TYPES ( tableMergeRow KEY( tranId) )

PERSIST NONE USING ( ) ;

--with dumpinput,dumpoutput

CREATE CQ renderAlertStream

INSERT INTO alertStream

SELECT w.tranId, w.tranCsn, w.trTime, w.opName, w.rowId, w.rowType

FROM MatchWindow w group by tranId, rowId having count(*) = 1;

CREATE CQ renderAlertStore

INSERT INTO AlertStore

SELECT *

FROM alertStream;

/**************************************************************** if row got replicated later outside of original match window, find the original alert and issue message to invalidate it with row type = 3 (instead of original types 1 or 2 )/

Compare current alerts for 1 hour with current match window

*****************************************************************/

CREATE WINDOW AlertsWindow OVER alertStream KEEP WITHIN 1 hour partition by tranId, rowId;

with dumpinput,dumpoutput

CREATE CQ renderInvalidateAlertStream

INSERT INTO AlertStore

SELECT w.tranId, w.tranCsn, w.trTime, w.opName, w.rowId, 3

FROM MatchWindow w, alertStream a where w.tranId = a.tranId and w.rowId = a.rowId and w.rowType = 2;

/************************************************************ collect statistics: speed and operation types; may be displayed, as shown in Figure 5

************************************************************/

CREATE TYPE LoadStatsType ( statType    String KEY, val       int

);

CREATE WACTIONSTORE StatStore CONTEXT OF LoadStatsType

EVENT TYPES ( LoadStatsType KEY( statType) )

PERSIST NONE USING ( );

CREATE CQ renderStatStore

INSERT INTO StatStore

SELECT

"speed", count(*)

FROM replicatedRowsWindow w1;

CREATE WACTIONSTORE StatStore2 CONTEXT OF LoadStatsType

EVENT TYPES ( LoadStatsType KEY( statType) )

PERSIST NONE USING ( );

CREATE CQ renderStatStore2

INSERT INTO StatStore2

SELECT opName, count(*)

FROM replicatedRowsWindow w1 group by opName;

END FLOW TableSynchLogic;

END APPLICATION TableSynchApp;

-- create dashboard using "ClientApps/StateStreet/TableSynchDash.json";

-- DEPLOY APPLICATION TableSynchApp;

-- START APPLICATION TableSynchApp;

The invention claimed is:

1. A method implemented in a computer network, comprising:
   identifying a transactional change data capture event at a transactional database;
   creating a transaction event stream with metadata characterizing the transactional change data capture event;
   identifying a replication change data capture event at a replication database corresponding to the transactional database;
   creating a replication event stream with metadata characterizing the replication change data capture event; and
   evaluating the transaction event stream and the replication event stream to check that every transaction committed on the transactional database is also committed on the replication database and selectively identify a replication performance failure within a specified time threshold of the replication performance failure, wherein evaluating is performed by an in-memory stream processor operative as a continuous query engine that applies rules and reports events on in flight data and thereby provides a real-time verification mechanism that continuously and incrementally monitors replication operations prior to replication failure.

2. The method of claim 1 further comprising identifying a missing database transaction.

3. The method of claim 1 further comprising identifying a database table associated with the replication performance failure.

* * * * *